United States Patent [19]

Miller

[11] 4,138,715
[45] Feb. 6, 1979

[54] RESONANT SWITCHING CONVERTER
[75] Inventor: Edward J. Miller, Littleton, Colo.
[73] Assignee: Martin Marietta Corporation, Bethesda, Md.
[21] Appl. No.: 841,090
[22] Filed: Oct. 11, 1977

Related U.S. Application Data

[63] Continuation of Ser. No. 653,996, Jan. 28, 1976, abandoned.
[51] Int. Cl.$^2$ ............................................. H02M 3/135
[52] U.S. Cl. ........................................ 363/28; 363/96; 363/97
[58] Field of Search ............... 320/1; 363/27, 28, 60, 363/96, 97; 323/17

[56] References Cited
U.S. PATENT DOCUMENTS 3,259,829  7/1966  Feth ........................................ 363/60

*Primary Examiner*—William M. Shoop

[57] ABSTRACT

A DC to DC converter employs resonant switching to turn switching power devices on and off at zero current. Two series resonant circuits are formed by two inductors connected in series between a voltage source and a power switch and a capacitor connected between the junction of the two inductors and a source of reference potential. The values of the two inductors are chosen so that the natural resonant frequency of the second inductor and the capacitor is high compared to the natural resonant frequency of the first inductor and the capacitor. The power switch may be a semiconductor switch, such as a silicon controlled rectifier or a junction transistor. Both non-isolated and isolated outputs may be provided in buck or boost conversion. The converter can be used as a voltage regulator by the addition of output sensing, comparison with a reference voltage, and suitable on-off control.

12 Claims, 12 Drawing Figures

RESONANT SWITCHING CONVERTER

This a continuation, of application Ser. No. 653,996, filed Jan. 28, 1976 now abandoned.

BACKGROUND OF THE INVENTION

The present invention generally relates to DC to DC converters, also known as inverters, and more particularly to a resonant switching converter in which switching power devices are turned on and off at zero current, resulting in great reductions in switching losses at any power handling level.

The efficiency, frequency and miniaturization of conventional DC to DC converters is limited mainly by switching losses. The switches employed in these circuits typically open and close with high currents, resulting in high power transients that stress the switches and cause power losses and high electromagnetic interference. The switching losses for a 500 watt converter, operating at 10 KHz and using the best conventional techniques, can be as high as 40 watts. This dissipation occurs in short transients with peaks to 4 kilowatts. The voltages and currents have extremely high frequency components due to spiked or square waveshapes. Besides electromagnetic interference problems, these high frequency components cause additional power losses or reduced reliability in magnetic devices, in filter capacitors, and in the reverse recovery of diodes. Moreover, the weight devoted to electromagnetic interference shielding can be considerable.

SUMMARY OF THE INVENTION

It is therefore a principal object of this invention to improve the efficiency and reduce the size of DC to DC converters.

It is another object of this invention to greatly reduce the magnitude and bandwidth of electromagnetic interference generated by DC to DC converters.

It is yet another object of the invention to increase the power handling capabilities of power switching devices used in DC to DC converters.

The foregoing and other objects of the invention are attained by employing resonant switching in a DC to DC converter to obtain turn-on and turn-off switching of power control devices at zero current. Basically, the invention employs two series resonant circuits composed of two inductors connected in series between a source of voltage and a power switching device and a capacitor connected between the junction of the two inductors and a source of reference potential. The values of the inductors are chosen so that the natural resonant frequency of the second inductor and the capacitor is high compared to natural resonant frequency of the first inductor and capacitor. Because of this relation, the current in the first inductor has only a minor effect on the resonant behavior of the current in the second inductor. When the power switching device is turned on, the current flowing in the second inductor rises and falls sinusoidally. At the point when the energy in the second inductor is zero, a control device senses this condition and turns the switching device off. Following this cycle, there is a recovery period for the capacitor to recharge through the first inductor before the power switching device can once again be turned on.

BRIEF DESCRIPTION OF THE DRAWINGS

The specific nature of the invention, as well as other objects, aspects, uses, and advantages thereof, will clearly appear from the following description and from the accompanying drawings, in which.

DESCRIPTION OF THE PREFERRED EMBODIMENTS

Figure 1:
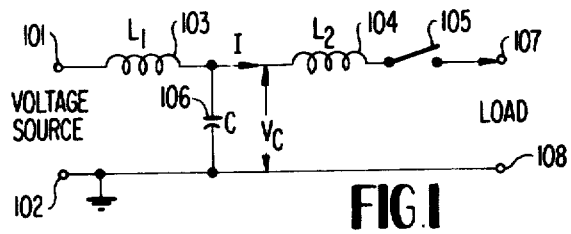
FIG. 1 is a simplified schematic diagram illustrating the principle of operation of the invention.
Figure 2:
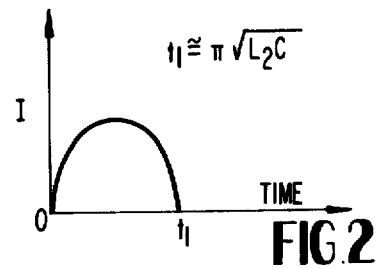
FIG. 2 is a waveform illustrating the operation of the circuit shown in FIG. 1.

The basic theory of the resonant switching DC to DC converter according to the invention will be explained with reference to FIGS. 1 and 2. As shown in FIG. 1, a voltage source is connected across input terminals 101 and 102. Two inductors 103 and 104 are connected in series between the input terminal 101 and a power switching device 105. A capacitor 106 is connected between the junction of inductors 103 and 104 and a source of reference potential or ground. Input terminal 102 is also referenced to ground. A load is connected across output terminals 107 and 108. Switch 105 is connected to output terminal 107, and output terminal 108 is connected to ground. The capacitor 106 is charged through the inductor 103 and, when switch 105 is on, the capacitor 106 discharges through inductor 104.

At time t = 0, the voltage across the capacitor 106 $V_C$ is positive relative to ground. Switch 105 is turned on a time t = 0. The values of the inductances $L_1$ and $L_2$ of the inductors 103 and 104, respectively, are chosen to set the natural resonant frequency of $L_2C$ high as compared to the natural resonant frequency of $L_1C$. Because of this relation, the current in inductor 103 has only a minor effect on the resonant behavior of the current in inductor 104. Beginning at time t = 0, then, the current I rises and falls sinusoidally, reaching zero at time t = $t_1$. At this point, the energy in inductor 104 is zero. A control device senses this condition and turns switch 105 off at the zero crossover point of current I. The switching losses at time t = 0 and time t = $t_1$ are zero. Following time t = $t_1$, there must be a recovery period for the capacitor 106 to recharge through the inductor 103 before the switch 105 can again be turned on.

Figure 3:
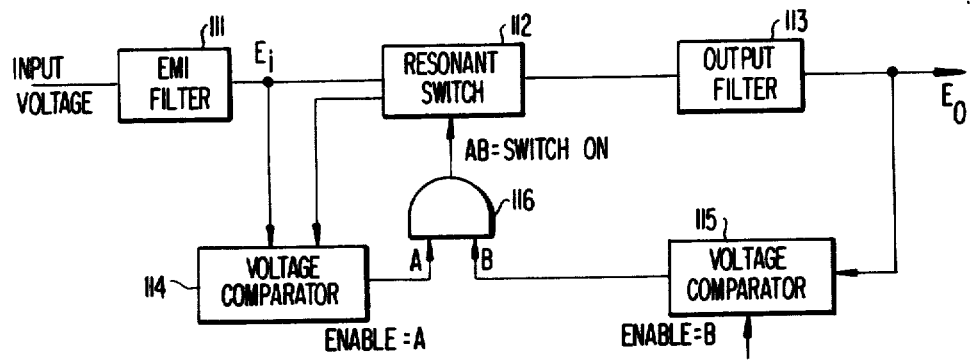
FIG. 3 is a functional block diagram illustrating the operation of the invention employing the principles of operation described with respect to FIG. 1.

A block diagram illustrating the DC to DC converter employing resonant switching is shown in FIG. 3. The input voltage is applied through an electromagnetic interference filter 111 to the resonant switch 112. The resonant switch 112 in its simplest form is that arrangement which is described and illustrated with respect to FIG. 1. The output voltage from the resonant switch 112 is connected to a load through an output filter 113. The input voltage $E_i$ from the electromagnetic interference filter 111 is applied at one input to a voltage comparator 114. The other input to voltage comparator 114 is derived from the capacitor in the resonant switch 112. The voltage comparator 114 generates an output when the resonant switch 112 has recovered from the previous switching operation. This output is used to turn the switching device in the resonant switch 112 on.

When the DC to DC converter is to be used as a voltage regulator, an additional voltage comparator 115 is used. This voltage comparator 115 receives as one input the output voltage $E_o$ from the output filter 113. The other input to the voltage comparator 115 is a reference voltage. Comparator 115 generates an output whenever the output voltage $E_o$ from the output filter 113 is low. The outputs of the two voltage comparators 114 and 115 are connected to an AND gate 116. Whenever both outputs are present, there will be an output from the AND gate 116 which will turn the power switching device in the resonant switch 112 on. Otherwise, the power switching device remains off.

At switch-on, the current through the resonant switch 112 starts from zero and, under control of the series resonant circuit $L_2C$, rises to a peak, falls back to zero, and turns off the switch at the zero current crossover. Comparator 114 now has a zero output which remains until the resonant circuit recovers from the switching operation. Then, if the output voltage $E_o$ from the output filter 113 is still low, the process is repeated until the output voltage is at the desired level. At this point, the comparator 115 provides a zero output, preventing further operation of the resonant switch 112 until the output voltage $E_o$ again becomes low.

High efficiency is achieved since the power switching device opens and closes only at zero current, and the switching losses are almost zero even at maximum power output. Since current under resonant control cannot have sharp rising and falling edges, the power dissipation in capacitors and in magnetic devices is also less than for conventional squarewave operation. Where electromagnetic interference is of concern, the smoothing effect of resonant circuits are also preferable to squarewave forms. In conventional regulators, frequency is determined largely by switching losses; however, the present invention largely eliminates switching losses thereby permitting much higher frequency operation. This higher frequency operation in turn permits a considerable reduction in weight in the DC to DC converter or regulator.

Figure 4:
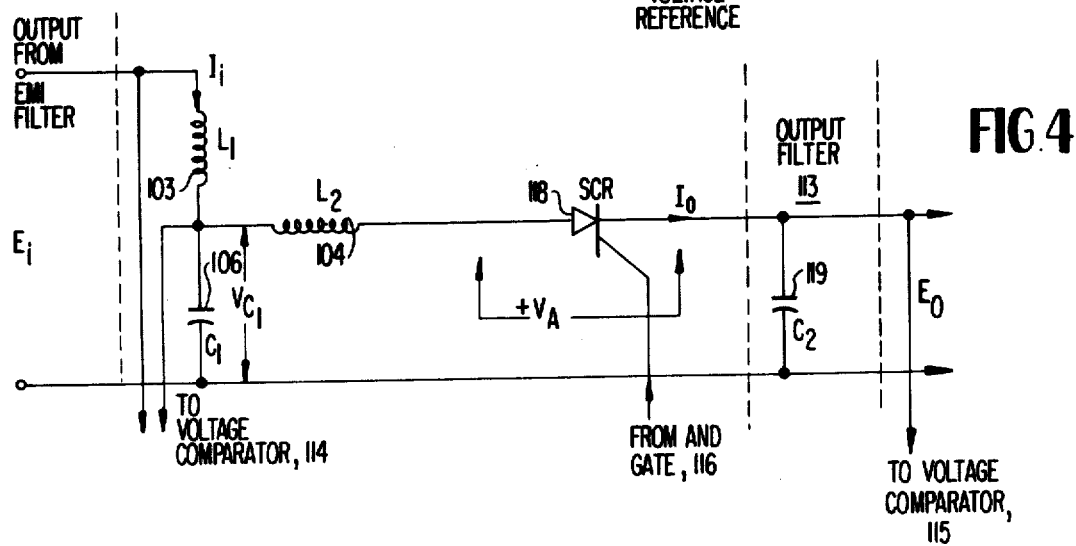
FIG. 4 is a schematic block diagram illustrating the embodiment of the invention employing a silicon controlled rectifier as a power switching device in series with a load in a buck converter.
Figure 5:
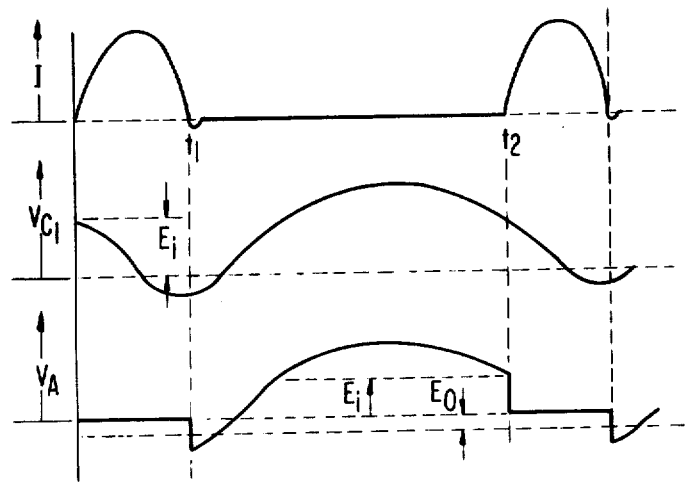
FIG. 5 is a waveform diagrams illustrating the operation of the circuit shown in FIG. 4.

A specific embodiment of a voltage regulator of the type illustrated in FIG. 3 using resonant switching is shown in FIG. 4. In this embodiment, a silicon controlled rectifier 118 is used for the power switching device 105. The anode of the silicon controlled rectifier is connected to the inductor 104, and the cathode of the silicon controlled rectifier is connected to the output filter 113. As illustrated, the output filter 113 may be a simple shunt capacitor 119. The output from AND gate 116 is applied to the gate electrode of the silicon controlled rectifier 118. The capacitance $C_2$ of capacitor 119 is very large compared to the capacitance $C_1$ of capacitor 106 and therefore does not affect the natural resonant frequency of $L_2C_1$. FIG. 5 shows typical waveforms. The silicon controlled rectifier 118 is turned on at time t = $t_0$. The current $I_o$ rises and falls sinusoidally, reaching zero at time t = $t_1$. At this point, the anode voltage $V_A$ of the silicon controlled rectifier reverses, thereby turning off the silicon controlled rectifier 118. The voltage $V_{C1}$ across the capacitor 106 then begins recovery by charging through the inductor 103. The recovery is sensed by the voltage comparator 114, and at time t = $t_2$, the silicon controlled rectifier is again turned on initiating another cycle if the output voltage $E_o$, is still low. The peak current is controlled by the input voltage $E_i$, by the energy stored in capacitor 106 at time t = $t_0$, and by the natural resonant frequency of $L_2C_1$.

Figure 6:
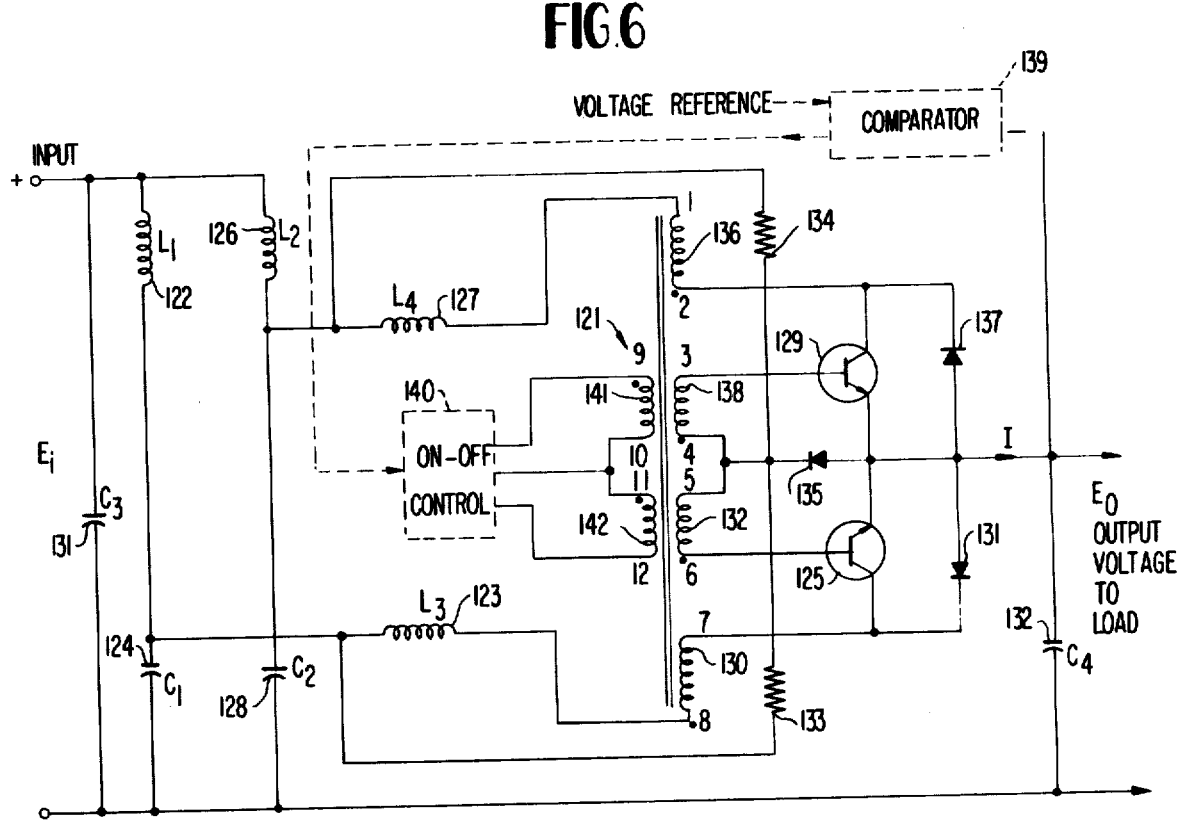
FIG. 6 is a schematic diagram of a push-pull buck converter employing junction transistors as power switching devices in series with the load.

A transistor may be used as the power switching element instead of a silicon controlled rectifier. In this case, current feedback provides an efficient sinusoidal base drive current. An example of this type of circuit is shown in FIG. 6 which illustrates a push-pull DC to DC converter using transistors as power switching elements. This circuit consists essentially of two identical halves coupled through a transformer 121. The first half comprises a resonant switching circuit including the inductors 122 and 123, the capacitor 124, and the transistor 125. These correspond to the inductors 103 and 104, the capacitor 106, and the switch 105, respectively, shown in FIG. 1. The other identical half comprises a resonant switching circuit including inductors 126 and 127, a capacitor 128, and transistor 129. The input electromagnetic interference filter comprises a capacitor 131, connected across the input to both resonant switching circuits, while the output filter comprises a capacitor 132 connected across the common junction of the emitters of transistors 125 and 129 and a source of reference potential or ground.

The two identical halves provide alternate switching, and a description of the circuit operation for one half section basically describes the operation of the whole circuit. Therefore, with reference to the half section comprising the inductors 122 and 123, the capacitor 124, and the transistor 125, there are as before two resonant circuits involved. The first consists of the series resonant circuit formed by the inductor 122 and the capacitor 124 having the natural resonant frequency of $L_1C_1$. The second resonant circuit having a higher natural resonant frequency than the first is formed by the series resonant circuit of inductor 123 and capacitor 124. Again, the capacitance $C_4$ of capacitor 132 is much larger than the capacitance $C_1$ of capacitor 124 so that the period of oscillation of the second series resonant circuit is practically determined by the inductance $L_3$ of inductor 123 and the capacitance $C_1$ of capacitor 124. As before, the period of oscillation of the first series resonant circuit comprises inductor 122 and capacitor 124 is considerably greater than the period of oscillation of the second resonant circuit comprising inductor 123 and capacitor 124.

In describing the circuit operation, it is assumed that the capacitor 124 (and also capacitor 128) has charged to the input voltage, and no switching has yet occurred. When the transistor 125 is turned on, the energy stored in capacitor 124 flows through the inductor 123, the secondary winding 130 of transformer 121, the transistor 125, and into capacitor 132 and the load. The collector current of transistor 125 is sinusoidal in nature, being zero at time t = t₀, increasing to a maximum and returning to zero at time t = t₁. Subsequent sinusoidal inverse current is fed through the diode 131, secondary winding 130, inductor 123 and back into capacitor 124, thereby aiding the recharge of capacitor 124 towards the input voltage level, at which time the current in inductor 123 has returned to zero. Transistor 125 is turned off shortly after the current through diode 131 begins to flow, no further conduction can occur, and the oscillation in the second series resonant circuit comprising inductor 123 and capacitor 124 is ended.

The energy in inductor 122 due to the recharging current to the capacitor 124 (initiated with discharge of capacitor 124 through inductor 123) is now fed almost completely into capacitor 124, and the voltage across capacitor 124 rises to approximately twice the input voltage at which time transistor 125 is again turned on and the entire operational cycle is repeated. Sinusoidal base drive for transistor 125 is derived from current feedback through secondary winding 132 of transformer 121. Resistors 133 and 134 and diode 135 provide base bias for transistors 125 and 129 to insure self-starting. The operation of the other half of the circuit including transistor 129 is identical to that just described but is phase-shifted 180° relative to the operation of the half including transistor 125. To this end, current discharges from capacitor 128 through inductor 127, secondary winding 136 of transformer 121 and transistor 129 into capacitor 132 and the load. A diode 137 provides a current path for the inverse current through secondary winding 136 and inductor 127 back into capacitor 128. Current feedback for transistor 129 is provided by the secondary winding 138 of transformer 121.

Figure 7:
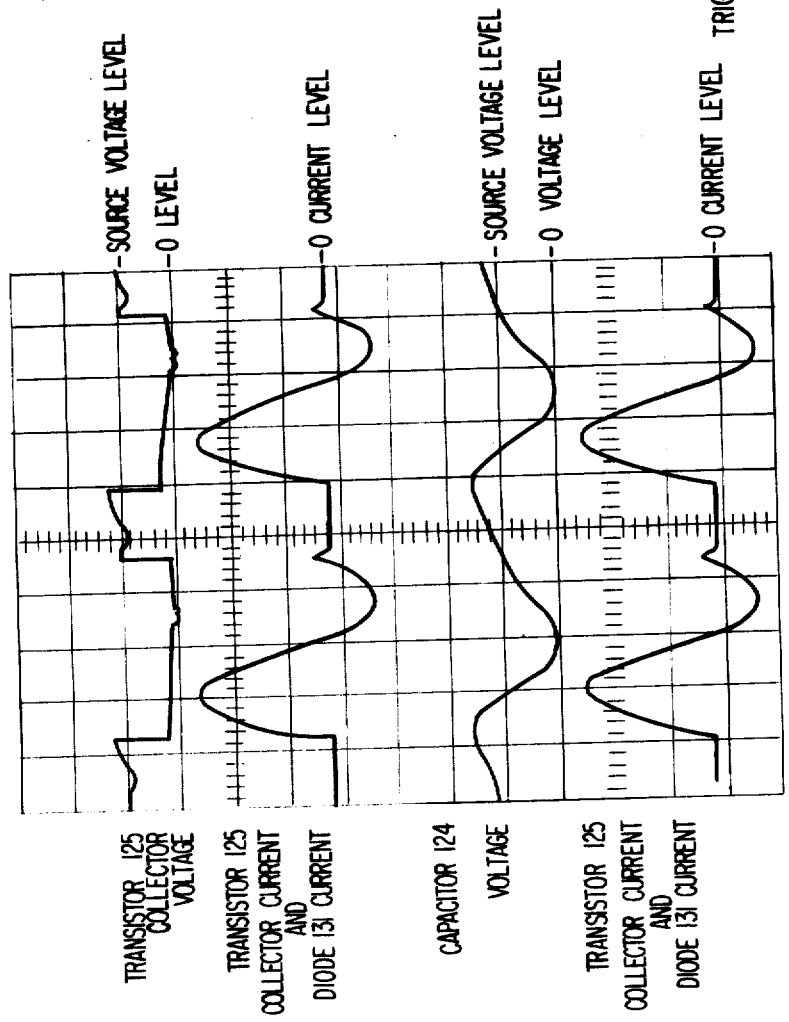
FIG. 7 is waveform diagrams illustrating the operation of the circuit shown in FIG. 6.

FIG. 7 shows the waveforms of the operation of the half of the circuit which includes transistor 125. It will be noted that there are virtually no switching power transients in the waveforms with the result that a minimal amount of electromagnetic interference is generated.

Regulation of the output voltage of the converter shown in FIG. 6 is accomplished by means of the comparator 139 connected across the load and receiving a voltage reference potential and providing an output to the on-off control 140. The on-off control 140 is a clamp circuit which disables the converter when the output voltage E₀ is higher than the reference voltage and enables the converter when the output voltage E₀ is lower than the reference voltage. To this end, the on-off control 140 is connected to the primary windings 141 and 142 of the transformer.

Figure 8:
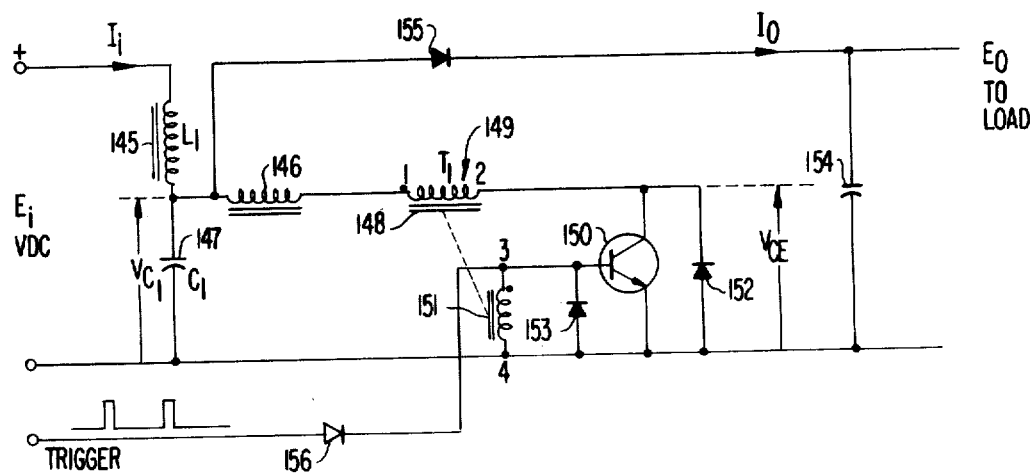
FIG. 8 is a schematic diagram of a boost converter using a single junction transistor as a power switching device not in series with the load.
Figure 9:
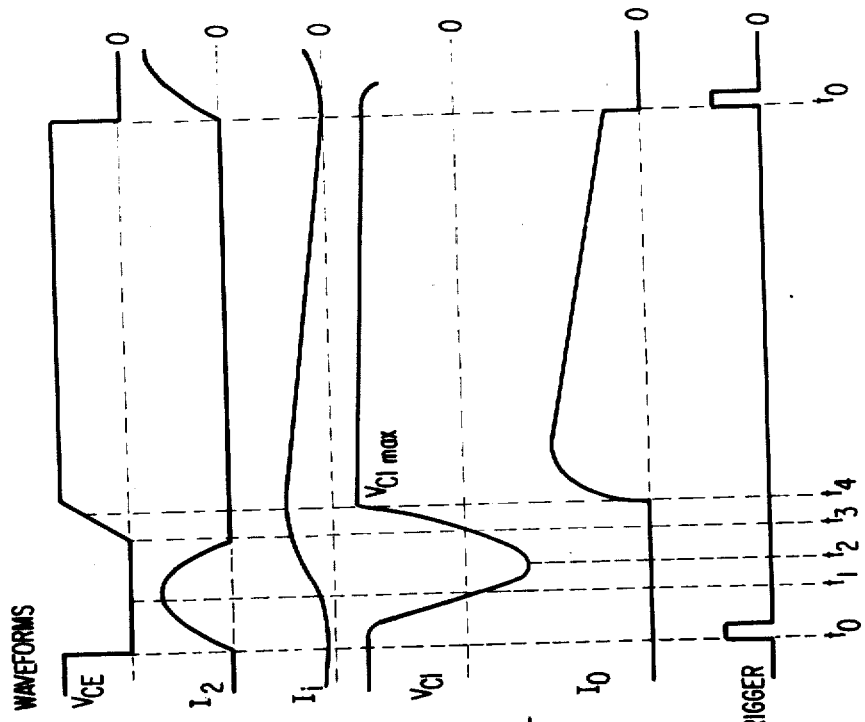
FIG. 9 is waveform diagrams of the operation of the circuit shown in FIG. 8.

The specific embodiments shown in FIGS. 4 and 6 both provide non-isolated outputs in which the load has the same reference as the source. Both of these DC to DC converters are buck converters in which the output voltage is lower than the source voltage. The invention, however, is equally applicable to boost conversion in which the output voltage is higher than the source voltage. Such a circuit, again providing a non-isolated output, is shown in FIG. 8. In this circuit, there are first and second inductors 145 and 146 and a capacitor 147. The first series resonant circuit comprises the inductor 145 and the capacitor 147, and the second series resonant circuit comprises the inductor 146 and the capacitor 147. FIG. 9 illustrates waveforms of the operation of the boost converter shown in FIG. 8. At time t = t₀, capacitor 147 discharges through inductor 146, the primary winding 148 of transformer 149, and transistor 150. Current feedback for the transistor 150 is provided by the secondary winding 151 of transformer 149. Diode 152 connected across the collector and emitter of transistor 150 protects transistor 150 from possible reverse currents, while diode 153 connected between the base and the emitter of transistor 150 limits the reverse voltage on the base-emitter junction. Energy is delivered to the output filter comprising the capacitor 154 and the load via diode 155 connected to the junction of inductors 145 and 146 while transistor 150 is off beginning at time t = t₄ when the collector voltage $V_{C1}$ rises to a maximum. This energy comes partly from the capacitor 147 and partly from inductor 145 because the input current $I_i$ is also at a high level at time t = t₄. Trigger pulses from an output comparator are applied to the base of transistor 150 via diode 156.

Figure 10:
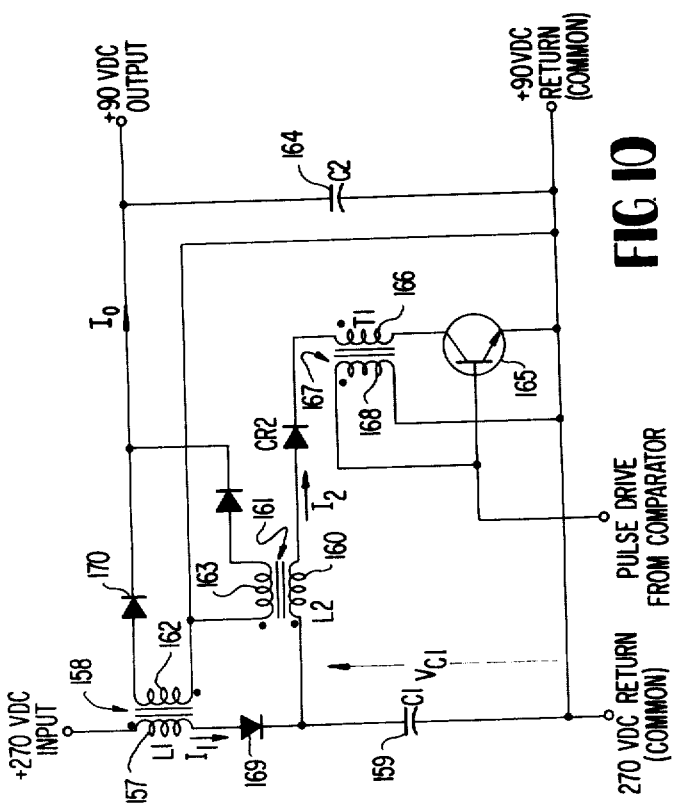
FIG. 10 is a schematic diagram of a buck-boost converter providing an isolated output to the load in which the source voltage can range above and below the load voltage.

Other variations of the invention are also possible. For example, FIG. 10 illustrates a buck or boost DC to DC converter is which the source voltage ranges above or below the load voltage. In addition, this converter provides an isolated output. In this circuit, the first series resonant circuit is composed of an inductor 157 which is the primary winding of a transformer 158 which is in series with a capacitor 159. The second series resonant circuit is composed of an inductor 160 which is the primary winding of a transformer 161 which is in series with capacitor 159. The secondary windings 162 and 163 of transformers 158 and 161, respectively, serve as flyback windings for delivering energy to the load. Capacitor 164 is an output filter capacitor connected across the load. Transistor 165 has its collector connected in series with the primary winding 166 of transformer 167 and the primary winding 160 of transformer 161. Transistor 165 is driven by external pulses applied to its base by an output comparator as before and serves as a switch to develop resonant currents through the two series resonant circuits. Current feedback for the transistor 165 is provided by the secondary winding 168 of transformer 167.

A description of the circuit operation begins with the assumption that the capacitor 159 has charged to the input voltage and no switching has occurred. When transistor 165 is turned on, the energy stored in capacitor 159 is fed through the inductor 160 resulting in a rising collector current of transistor 165. This current is sinusoidal in nature and increases to a maximum and returns to zero as in the preceding embodiments. During decay of this current, flyback energy is delivered to the load by the secondary winding 163 of transformer 161. Current in the inductor 157 is initiated a short period of time following the decay of the voltage across the capacitor 159. This is accomplished by the action of diode 169 which permits the voltage across capacitor 159 to be charged in excess of the input voltage. The rising sinusoidal current through inductor 157 recharges capacitor 159 back to approximately the input voltage level at the peak level of the current through inductor 157. As the current through inductor 157 decreases following the peak current, a portion of the energy in inductor 157 is coupled into the load by the secondary winding 162 and the diode 170. The remainder of the energy in inductor 157 recharges capacitor 159 to a peak voltage above the input voltage at which time diode 169 becomes reverse biased, and capacitor 159 is held at this peak voltage.

Figure 11:
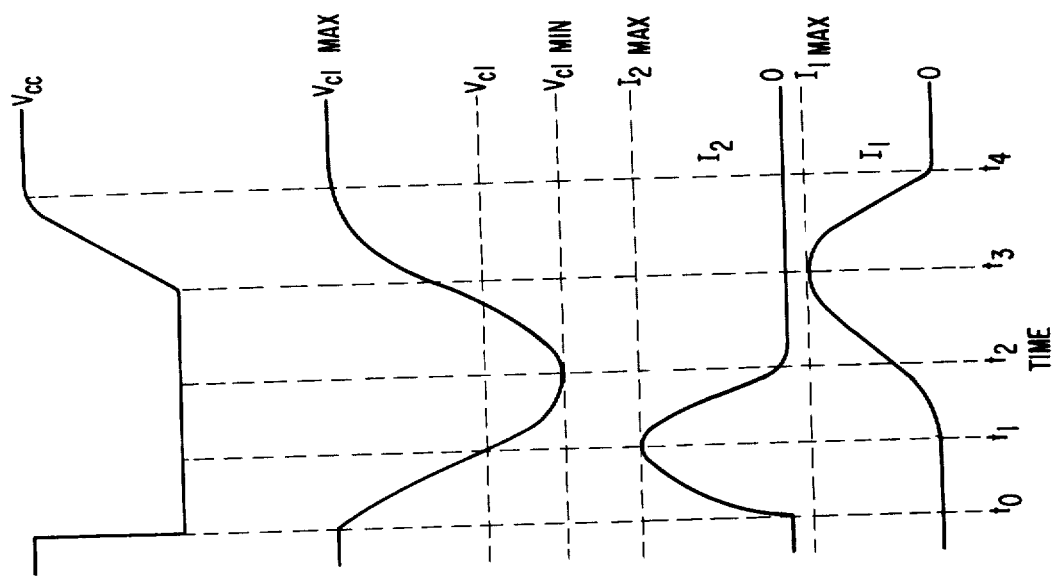
FIG. 11 is waveform diagrams illustrating the operation of the circuit shown in FIG. 10.

The operation of the circuit shown in FIG. 10 will be better appreciated with reference to the waveform diagrams shown in FIG. 11. At time $t = t_2$, current $I_2$ through the inductor 160 has sinusoidally decayed to zero, and the voltage across capacitor 159 has decayed to a minimum ($V_{C1\ min}$) and the current $I_1$ is still increasing sinusoidally. At time $t = t_3$, current $I_1$ reaches a maximum current ($I_{1\ max}$) and the voltage across capacitor 159 is again approximately equal to the input voltage. At this point, the energy in inductor 157 is discharged into the capacitor 159, and current $I_1$ decreases with the voltage across the capacitor 159 reaching $V_{C1\ max}$ and the current $I_1$ decaying to zero at time $t = t_4$. Subsequent to the decay of current $I_2$ to zero, transistor 165 has turned off due to lack of drive. Capacitor 159 is now fully charged to $V_{C1\ max}$ voltage, and the currents $I_1$ and $I_2$ are both zero and the transistor 165 is off. The circuit has thus recovered, ready to be retriggered by a subsequent pulse from the comparator.

Figure 12:
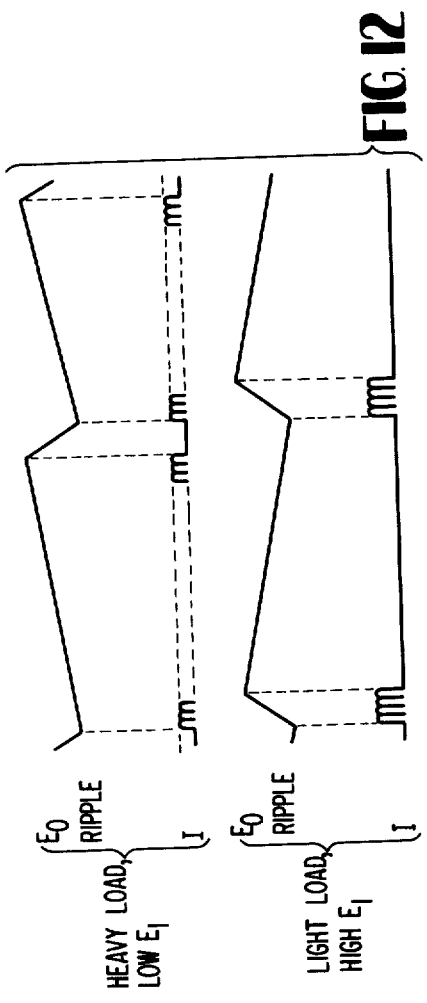
FIG. 12 is waveform diagrams illustrating the operation of the DC to DC converter according to the invention when used as a voltage regulator.

During the description of the several embodiments, it has been mentioned that the DC to DC converter according to the invention can be used as a voltage regulator, the description of which was provided with respect to FIG. 3, wherein a second voltage comparator 115 was added. The regulating function is illustrated in FIG. 12. The waveform labeled $E_o$ ripple represents the filtered converter output voltage. This ripple voltage has a peak-to-peak value of only a few millivolts. When it falls below the reference voltage to the comparator 115, the converter is turned on. The waveform labeled I refers particularly to current I in FIG. 6 and indicates that when the converter is on it runs full duty-cycle as it charges the output capacitor filter. By eliminating every second pulse in the waveform it would represent the current $I_o$ in FIGS. 4, 8 and 10 in which the converters run at approximately 50 percent duty cycle. The converter output voltage rises until the ripple is above the reference voltage to the comparator 115. At this point, the converter is turned off, the output voltage falls as the filter capacitor discharges into the load. When the output voltage again falls below the reference voltage to the comparator 115, the recharging cycle is repeated. The sensitivity of the comparator 115 is chosen so that the $E_o$ ripple is negligible by comparison to the desired output voltage $E_o$. As may be seen from the wave forms in FIG. 12, the regulation function may be described as pulse train modulation.

It will be apparent that the embodiments shown are only exemplary and that various modifications can be made in construction and arrangement within the scope of the invention as defined in the appended claims.

What is claimed is:

1. A resonant switching DC to DC converter for providing a DC output voltage to a load, comprising:
   a first series resonant circuit including a first inductor and a first capacitor adapted to be constantly connected in series with a source of input voltage, said first inductor forming a charging path for said first capacitor,
   a second series resonant circuit including a second inductor and said first capacitor, the natural resonant frequency of said second series resonant circuit being high compared to the natural resonant frequency of said first series resonant circuit so that the current in said first inductor has only a minor effect on the resonant behavior of the current in said second inductor,
   first switch means connected in series with said second inductor on the side opposite to said first capacitor for enabling a discharge path into said load for the charge stored by said first capacitor, and
   control means for sensing the second series resonant circuit current in said switch means and actuating said switch means when said current is zero.

2. A resonant switching DC to DC converter as recited in claim 1 further comprising first voltage comparator means connected to compare the input voltage with the voltage across said first capacitor for enabling said switch means when the two voltages are equal.

3. A resonant switching DC to DC converter as recited in claim 1 wherein said load is connected in series first switch means and said second series resonant circuit.

4. A resonant switching DC to DC converter as recited in claim 2 wherein said switch means is a silicon controlled rectifier having a gate electrode connected to said first voltage comparator means.

5. A resonant switching DC to DC converter as recited in claim 3 wherein said switch means is a transistor.

6. A resonant switching DC to DC converter as recited in claim 5 further comprising current feedback means connected to said base electrode of said transistor.

7. A resonant switching DC to DC converter as recited in claim 1 wherein a load is connected across said first capacitor.

8. A resonant switching DC to DC converter as recited in claim 1 wherein said first inductor is the primary winding of a first transformer and said second inductor is the primary winding of a second transformer, said first and second transformers having secondary windings connected in parallel, and a load is connected across the parallel connection of said secondary windings.

9. A resonant switching DC to DC converter as recited in claim 2 providing a regulated voltage output further comprising a second voltage comparator means connected to compare the output voltage of the converter with a reference voltage for enabling said switch means when said output voltage is less than said reference voltage, said switch means turning on only when enabled by both said first and said second voltage comparator means.

10. A resonant switching DC to DC converter as recited in claim 1 further comprising:
   a third series resonant circuit including a third inductor and a second capacitor adapted to be connected in series with said source of input voltage, said third inductor forming a charging path for said second capacitor,
   a fourth series resonant circuit including a fourth inductor and said second capacitor, the natural resonant frequency of said fourth series resonant circuit being equal to the natural resonant frequency of said second series resonant circuit and the natural resonant frequency of said third series resonant circuit being equal to the natural resonant frequency of said first series resonant circuit,
   second switch means connected in series with said fourth inductor on the side opposite to said second capacitor for enabling a discharge path into said load for the charge stored by said second capacitor, and second control means for sensing the fourth series resonant circuit current in said second switch means and actuating said second switch means when said current is zero, said first and second switch means being actuated 180° out of phase with one another.

11. A resonant switching DC to DC converter as recited in claim 10 wherein both said first and second switch means are transistors and further including current feedback means connected to the base electrodes of said transistors.

12. A resonant switching DC to DC converter as recited in claim 11 providing a regulated voltage output further comprising a voltage comparator means connected to compare the output voltage of the converter with a reference voltage for enabling said first and second switch means when said output voltage is less than said reference voltage.

* * * * *